3,143,885
OPEN FACE GAUGE CONSTRUCTION
Ralph D. Waite, Sellersville, and Harry W. Hoff, Jr., Quakertown, Pa., assignors to Ametek, Inc., New York, N.Y., a corporation of Delaware
Filed Dec. 6, 1961, Ser. No. 157,441
9 Claims. (Cl. 73—431)

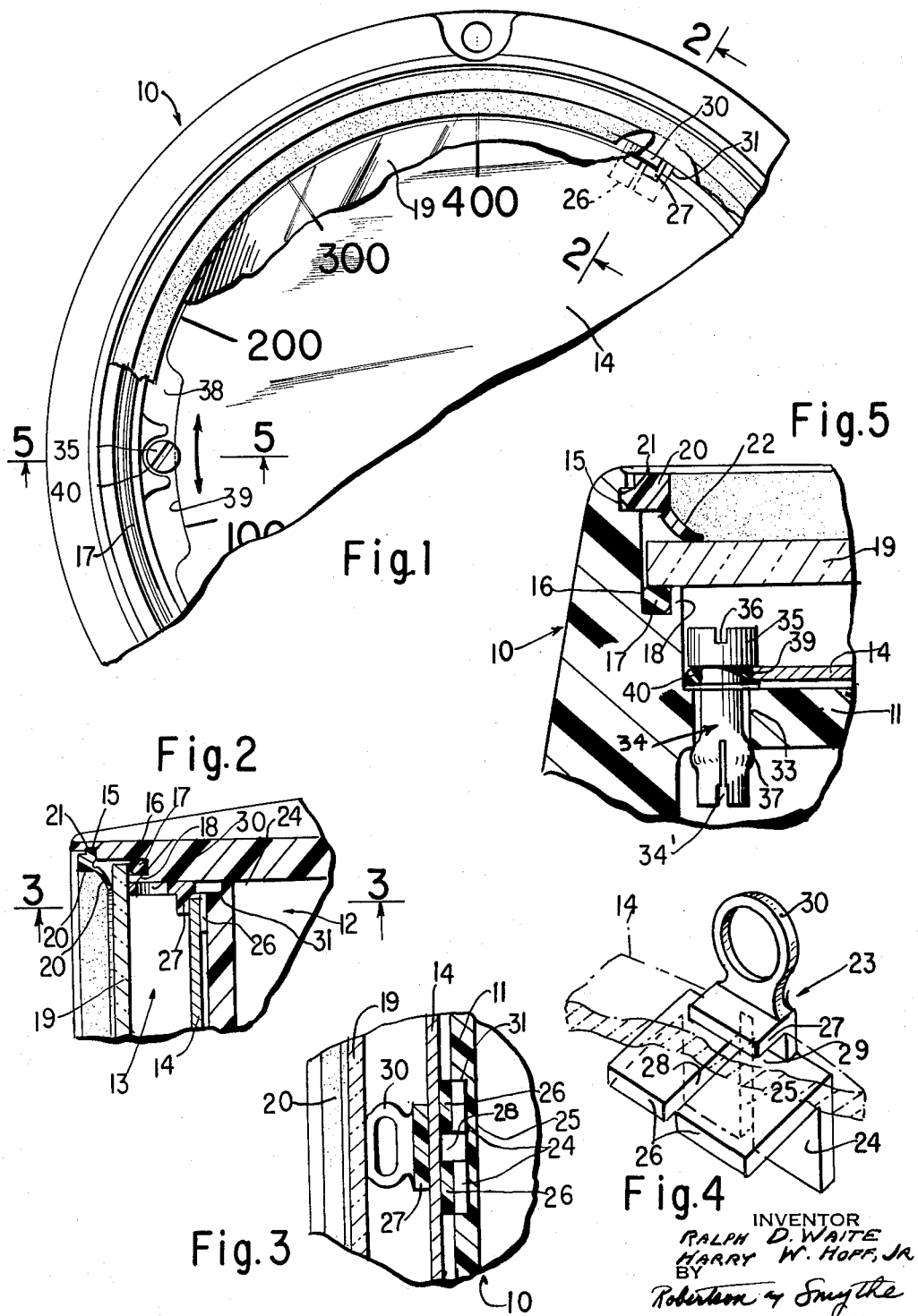

The present invention relates to pressure gauges and particularly to a new and improved bezel and face adjusting means for pressure gauges.

The principal object of the invention is to provide a pressure gauge and a bezel therefor of inexpensive construction yet superior to known devices of this type.

Another object of the invention is to provide a plastic bezel having a resilient skirt portion, in combination with a plastic resilient means for holding the gauge dial in proper position while permitting rotary adjustment thereof, the resilient skirt portion urging the gauge glass into engagement with a sealing ring.

Still another object of the invention is to provide a rotatable plastic pin that engages the dial edge for providing rotary adjustment thereof.

In one aspect of the invention, a hollow pressure gauge casing may be provided with a partition dividing it into two compartments, in one of which may be located the gauge mechanism and in the other, the gauge dial and indicating hand. The latter compartment may include a cylindrical wall forming an opening leading thereto. At the entrance to the opening of the casing, an internal peripheral, radially extending groove may be provided, and another internal peripheral, but axially extending, groove of less diameter than the radial groove may be located adjacent the radial groove. The axially extending groove may hold a gasket and provide a surface against which the gauge glass or similar material may abut.

In another aspect of the invention, a plastic bezel may be of annular form including an external peripheral lip adapted to be received within the radial groove in the casing, and also a skirt portion of frusto-conical form adapted to bear against the gauge glass when properly in position and to resiliently urge said glass into effective sealing relation with said gasket.

In still another aspect of the invention, a plastic member having spaced parallel arms adapted to straddle the dial edge, and depending leg means may be frictionally held within a recess which may be a slot or a blind hole in the partition of the casing, which recesses are located exteriorly of the dial edge. In this way, the dial is maintained in proper position relative to the partition within the casing. Attached to this plastic member may be a plastic upstanding ring adapted to engage the gauge glass on its interior surface. The plastic member preferably is made from a flexible plastic such as polypropylene which exhibits enduring flexible characteristics.

In still another aspect of the invention, the dial may have a portion of its peripheral edge relieved for receiving the shank of a plastic pin mounted within the casing partition. A friction-providing O-ring on the shank may engage the relieved edge of the dial so that upon turning the pin, the dial is rotatably adjusted.

The above, other objects and novel features of the invention will become apparent from the following specification and accompanying drawing which is merely exemplary.

In the drawing:

FIG. 1 is a partial front elevational view of a pressure gauge to which the principles of the invention have been applied;

FIG. 2 is an enlarged sectional view taken substantially along line 2—2 of FIG. 1;

FIG. 3 is a sectional view taken substantially along line 3—3 of FIG. 2;

FIG. 4 is a perspective view of a detail of the invention; and

FIG. 5 is an enlarged sectional view taken substantially along line 5—5 of FIG. 1.

Referring to the drawing, the principles of the invention are shown as applied to a pressure gauge including a hollow casing 10 which in the embodiment shown is an extrusion molded plastic casing.

A partition 11 (FIGS. 2 and 5) may divide the casing into compartments 12 and 13. Gauge mechanism (not shown) may be mounted in the usual way within compartment 12, and a dial 14 may be mounted within compartment 13. One end of the casing 10 may be open and a peripheral, radially extending groove 15 may be formed on the inner wall of the casing 10, having a diameter greater than that of the opening leading to the casing 10. Another peripheral, axially extending groove 16 may be formed adjacent groove 15, and it may support a gasket 17 and provide an annular wall 18 against which a transparent glass 19 may abut.

An annular bezel 20, formed from a flexible plastic such as polypropylene, may include a lip or flange 21 adapted to be received within the groove 15. The bezel 20 may also include a frusto-conical skirt portion 22 which resiliently acts against the outer surface of the glass 19 when the bezel is properly in place.

Referring to FIG. 4, a member 23, preferably made from polypropylene, may include a leg portion 24 having a slot 25 midway thereof. Parallel spaced arms 26 and 27 may extend at right angles from the leg 24, and a slot 28 may be provided midway of the arm 26. The space 29 between arms 26 and 27 may be such as to slidingly receive the edge of the dial 14. Extending in the same plane as legs 24 may be a ring 30 of the flexible plastic material.

Referring to FIG. 2, the partition 11 may include recesses 31, one for each member 23 that is to be employed. Usually two such members in spaced relation may suffice, although others may be employed if desired. Sliding the member 23 onto the edge of dial 14 so that it lies between the arms 26, 27 and forcing legs 24 through slot or blind hole 31 cause the latter to compress slightly so that when within slot or blind hole 31 with arm 26 against partition 11, the dial 14 is properly located slightly spaced from partition 11, but such that it can be rotatably adjusted since the arms 26, 27 slidingly receive the edge of dial 14. The diameter of the flexible plastic ring 30 is such that when the glass 19 is held in place by the bezel 20, the ring 30 is compressed to an ellipsoid form as shown in FIG. 3, thereby resiliently backing up glass 19.

Referring to FIG. 5, the partition 11 may be provided with a hole 33 through which a flexible plastic pin 34 extends. The pin 34 may include a head 35 at one end having a screwdriver slot 36 therein, and a portion 37 at its opposite end, having another screwdriver slot 34' therein, the portion 37 being flexible enough to compress in passing through hole 33 and then to expand, holding pin 34 in place. A section 38 (FIG. 1) of the edge of dial 14 may be relieved so that the relieved edge surface 39 passes beneath the head 35 of pin 34. A friction-providing ring 40 (FIG. 5) such as an O-ring may surround pin 34 and engage the edge 39. Accordingly, turning the pin 34 causes rotary adjustment of the dial 14 in order to set the zero value of the dial coincident with the gauge indicator hand when no pressure is applied to the gauge.

Although the various features of the invention have been shown and described in detail to fully disclose one embodiment of the invention, the bezel, of course, being extendable above and over the top of the case, it will be

What is claimed is:

1. In a gauge, an open ended casing; a partition within said casing dividing said casing into two compartments; a dial within one of said compartments; a transparent glass in said one compartment; a bezel holding said glass in place within said one compartment; and a flexible plastic element removably mounted on said partition for slidably holding the peripheral edge of said dial in slightly spaced relation from said partition and resiliently spaced from said glass.

2. In a gauge, an open ended casing; a partition within said casing dividing said casing into two compartments; a dial within one of said compartments; a transparent glass in said one compartment; a bezel holding said glass in place within said one compartment; a flexible plastic element including leg portions adapted to be received within a recess in said partition; spaced arm portions attached to said leg portions and extending at right angles thereto for slidingly receiving therebetween the edge of said dial; and means forming part of said flexible plastic element for resiliently contacting said glass.

3. In a gauge, an open ended casing; a partition within said casing dividing said casing into two compartments; a dial within one of said compartments; a transparent glass in said one compartment; a bezel holding said glass in place within said one compartment; a flexible plastic element including leg portions adapted to be received within a recess in said partition; spaced arm portions attached to said leg portions and extending at right angles thereto for slidingly receiving therebetween the edge of said dial; and ring means forming part of said flexible plastic element for resiliently contacting said glass.

4. In a gauge, an open ended casing; a partition within said casing dividing said casing into two compartments; a dial within one of said compartments; a transparent glass in said one compartment; a bezel holding said glass in place within said one compartment; a polypropylene element including leg portions adapted to be received within a slot in said partition; spaced arm portions attached to said leg portions and extending at right angles thereto for slidingly receiving therebetween the edge of said dial; and means forming part of said polypropylene element for resiliently contacting said glass.

5. In a gauge, an open ended casing; a partition within said casing dividing said casing into two compartments, a dial within one of said compartments; a transparent glass in said one compartment; a bezel holding said glass in place within said one compartment; a polypropylene element including leg portions adapted to be received within a recess in said partition; spaced arm portions attached to said leg portions and extending at right angles thereto for slidingly receiving therebetween the edge of said dial; and ring means forming part of said polypropylene element for resiliently contacting said glass.

6. In a gauge, an open ended casing having an undercut groove adjacent to, and of greater diameter than that of the opening leading thereto; a partition within said casing dividing said casing into two compartments; a dial within one of said compartments; a transparent glass in said one compartment; a bezel outwardly of said glass for holding said glass in place within said one compartment, said bezel comprising a polypropylene member of annular form having an external flange of slightly greater diameter than the opening leading to said casing; and a polypropylene element removably mounted on said partition inwardly of said glass for slidably holding said dial in slightly spaced relation from said partition and glass and adapted to resiliently contact said glass and urge it toward said bezel.

7. In a gauge, an open ended casing; a partition within said casing dividing said casing into two compartments; a dial within one of said compartments; a transparent glass in said one compartment; a bezel for holding said glass in place within said one compartment; a flexible plastic element including leg portions adapted to be received within a recess in said partition; spaced arm portions attached to said leg portions and extending at right angles thereto for slidingly receiving therebetween the edge of said dial; means forming part of said flexible plastic element for resiliently contacting said glass; a rotatable pin extending through said partition; and a frictional element surrounding said pin and engaging the edge of said dial, whereby upon turning said pin, said dial is rotatably adjusted.

8. In a gauge, an open ended casing; a partition within said casing dividing said casing into two compartments; a dial within one of said compartments; a transparent glass in said one compartment; a bezel for holding said glass in place within said one compartment; a flexible plastic element including leg portions adapted to be received within a recess in said partition; spaced arm portions attached to said leg portions and extending at right angles thereto for sliding receiving therebetween the edge of said dial; ring means forming part of said flexible plastic element for resiliently contacting said glass; a rotatable pin extending through said partition; and a frictional element surrounding said pin and engaging the edge of said dial, whereby upon turning said pin, said dial is rotatably adjusted.

9. In a gauge having a case with an open end, said open end having an undercut groove, a glass means for said gauge insertable in said open end; abutment means for limiting the inward movement of said glass means; and a plastic bezel outwardly of said glass comprising an annular member having an external flange thereon of slightly greater diameter than that of said undercut groove and an internally extending frustoconical skirt portion, said external flange and skirt being of resilient material so as to allow it to be snapped into the undercut groove of said case and said skirt portion resiliently engaging said glass means, whereby said glass means is held in place by the inward pressure of the skirt portion of said bezel.

References Cited in the file of this patent

UNITED STATES PATENTS

| | | |
|---|---|---|
| 1,371,371 | Hinsman | Mar. 15, 1921 |
| 2,368,105 | Berge | Jan. 30, 1945 |
| 2,686,424 | Aller | Aug. 17, 1954 |
| 2,918,819 | Freeman | Dec. 29, 1959 |